United States Patent Office 2,650,212

UNITED STATES PATENT OFFICE 2,650,212

ADHESIVE COMPOSITION COMPRISING A DIISOCYANATE MODIFIED POLYESTER

Erwin Windemuth, Leverkusen-Bayerwerk, Germany, assignor to Farbenfabriken Bayer Aktiengesellschaft, Leverkusen, Germany, a corporation of Germany No Drawing. Application August 20, 1949, Serial No. 111,565

12 Claims. (Cl. 260—75)

It has already been proposed to prepare diisocyanate modified polyesters from linear or moderately cross linked polyesters soluble in organic solvents, which contain at least one hydroxyl and/or one carboxyl group by reacting the polyester with diisocyanates in such an amount that two isocyanate groups correspond to each hydroxyl or carboxyl group.

Isocyanatepolyesters of this kind are converted into macromolecular polyurea compounds by reaction with water. This reaction may be utilized for the production of varnishes, synthetic resins, adhesives and the like, since it leads to an enlargement of the molecule.

It has further been proposed to accelerate the reaction of diisocyanates with polyhydroxy compounds by the addition of tertiary amines.

The addition of tertiary amines to aromatic polyisocyanates causes a reaction which probably consists in a polymerisation of the isocyanates and which leads to a premature solidification of the mixture. I have found that this reaction does not ensue in compounds having isocyanate groups linked in aliphatic or cycloaliphatic linkage, if and as long as water is completely excluded. However, if the isocyanate is allowed to react with water, the accelerating effect of the tertiary amine is at once noticeable and the formation of the corresponding polyurea occurs very quickly already at normal temperature.

The catalytic action of the tertiary amines on the reaction of di- or polyisocyanates of low molecular weight with water is such, that an explosive reaction occurs when the components are mixed with the formation of the corresponding polyureas and of carbondioxide. Technically an acceleration of the reaction of this kind is probably without value. If, however, the reaction employing the catalytic acition of the tertiary amines is carried out with bigger molecules, such as the above named isocyanate polyesters, the reaction proceeds much more slowly.

This discovery may be utilized with valuable results. It is, therefore, the object of this invention to prepare moldable mixtures or mixtures capable of being utilized as adhesives. The process of the invention comprises mixing an anhydrous, substantially linear diisocyanate modified polyester produced by the reaction of an aliphatic diisocyanate with a polycarboxylic acid polyester, said reaction product containing as sole reactive groups isocyanate groups linked to aliphatic carbon atoms, with a catalytic amount of a tertiary amine free of reactive hydrogen and storing the product under anhydrous conditions. The resulting mixture is completely stable under perfect exclusion of water. Such mixtures may be stored for months and even years without any change. In the presence of water, however, the solutions are converted at normal temperatures in an exothermic reaction with the formation of carbondioxide into macromolecular plastics which may have an elastic character depending upon the composition of the polyesters employed as starting materials.

The following polyesters may principally be employed as primary products: the polyesters from adipic acid and diethyleneglycol or other polyglycols, furthermore, polyesters from adipic acid and 1.2-propyleneglycol, thiodiglycol, quinite and others. Furthermore, the following acids may be employed in the polycondensation: succinic acid, sebacic acid, thiodibutyric acid and maleic acid. Preferably such polyester combinations are employed as are still liquid at room temperature. Hydroxycarboxylic acids may also be used in the production of the polyesters. The polycondensation is carried out in the usual manner by heating to temperatures of about 100 to 250° C. The employment of an excess of glycol is preferred, whereby hydroxyl numbers of 20 to 80, preferably 40 to 60, are obtained, while the carboxyl number is practically zero. It is not necessary for the polyesters to be purely linear in structure. They may contain cross links but only to a slight degree. Otherwise they become insoluble when the diisocyanates are added. The polyesters obtained by polycondensation are dried prior to the reaction with the diisocyanates by heating in vacuo, or by passing an inert gas through the mass.

Suitable aliphatic or cycloaliphatic polyisocyanates are tetramethylenediisocyanate, hexamethylenediisocyanate, dodecamethylenediisocyanate, cyclohexanediisocyanate, dicyclohexylmethanediisocyanate, thiodipropyldiisocyanate and others.

As tertiary amines which may be employed as catalysts, the following are named: trialkylamines, dimethylpiperazine, dimethylaminocyclohexane (hexahydrodimethylaniline), perhydroethylcarbazol, methyl- or butylpyrrolidine and its homologues, quinoline and its homologues. The action of the tertiary amines depends upon their basic character. Triethylamine exhibits the strongest action, while quinoline has the least influence on the speed of the reaction.

The solidification of the isocyanate modified polyesters by reaction with water under the catalytic influence of the tertiary amines may be utilized in numerous and various ways. The reaction is exceptionally suited for purposes of adhesion and preferably employed where an elastic bond of the material to be joined is desirable, as for instance in the bonding of driving belts, in the production of multilayer material from split leather, in the production of plywood from thin veneers or in the doubling of fabrics to yield valuable watertight fabrics such as are used for automobile covers. Finally the solutions may be employed as adhesives in the production of shoes and in shoe repairs. Further fields in which the invention may be employed, are the production of elastic threads, of films or foils, of tubes, of elastic medical bandages, and in the production of composite sheet fabrics. Compact self-hardening masses may also be produced by mixing the isocyanate modified polyester containing the catalyst with fillers containing water. Numerous inside surfaces exuding water are formed thereby, which enable the originally liquid mass to solidify. The products obtained in this manner are filled with bubbles, so that it is possible to produce cellular materials of varying porosity.

Finally bubble free, self-hardening masses may be obtained by employing as fillers substances which bind carbondioxide chemically either as such or in combination with other fillers. As an example for a filler of this kind soda lime is mentioned.

Processes of this kind are employed principally in the manufacture of artificial limbs, cable inlets through watertight compartment walls of ships and in the building of models.

In a great many cases it is preferable not to cause hardening or solidification by the action of water baths or substances yielding water but simply by allowing the humidity of the air to react on the molded products or the adhesive bonds. This applies especially to the solidification of foils, threads, impregnations and adhesives, where the material is present in thin layers.

*Example 1*

A polyester from diethyleneglycol and adipic acid having an hydroxyl number of 48.6 and an acid number of 0.8 is dried by heating for two hours at 100° C. in vacuo of 2 mm. and is then reacted with 12 per cent of its weight of hexamethylenediisocyanate at 100° C. This temperature is kept for an hour, the components being well mixed by stirring. One per cent hexahydrodimethylaniline is added after the viscous melt has cooled down.

This mass is transferred into a vessel provided with a spinning nozzle of 1 mm. in width and spun into a bath containing ten per cent piperazine with a pressure of seven pounds per square inch. The thread which is still soft inside after passing through the piperazine bath is wound on a bobbin and left there. After storing for one hour at room temperature it has solidified and a highly elastic thread is obtained.

*Example 2*

1000 parts by weight of a hydroxylpolyester from adipic acid and diethyleneglycol having an hydroxyl number of 33.0 and an acid number of 1.5 are dried for several hours in vacuo of 12 mm. at a temperature of 100° C. while stirring. Thereafter at the same temperature 104 parts by weight of hexamethylenediisocyanate are added, the temperature being kept at 100° C. for an hour and a half. A highly viscous melt results having an isocyanate content of 1.4 per cent. If the mass is exposed to the humidity of the air the material is gradually transferred from the liquid to the solid state—in the present case the rubber-elastic state—within days or weeks. If, however, the viscous mass is mixed with two per cent of hexahydrodimethylaniline, the time required for the conversion into the solid rubber-elastic state under the same conditions is decreased to about 20–30 minutes. Since the elastic surface layer, which forms quickly, protects the underlying mass from reaction with the humidity of the air to a high degree—but not completely—the thorough reaction of the mass proceeds only slowly, the more so as the protecting solid layer becomes thicker.

If the mass is carefully excluded from reaction with the humidity of the air, it keeps for a long time without solidifying. It is extremely well suited for adhesive purposes and is preferably used where an elastic binding of the surfaces to be connected is desired, for instance in joining the ends of driving belts from leather, synthetic rubber or textiles.

The ends of the driving belts to be joined are tapered and coated with a 75 per cent benzene solution of the above named mixture. After waiting for about ten minutes after the coating has been effected, during which time the same takes up water from the air, the tapered ends are joined and left for 2–3 hours at room temperature under moderate pressure. The adhesive solution has then been converted into an elastic film. The adhesion obtained meets all claims as regards tear resistance and alternate bending.

*Example 3*

1425 parts by weight of a polyester from adipic acid and diglycol with an hydroxyl number of 22.8 and an acid number of 0.6 are reacted with 114 parts by weight of hexamethylenediisocyanate at 100° C., dissolved in benzene to an 80 per cent solution and finally mixed with 31 parts by weight of hexahydrodimethylaniline.

This solution is introduced into a horizontally rotating tube with a wide lumen. After the solution has been equally distributed on the inner walls of the tube, a stream of air laden with humidity is passed through the inside of the tube. After an hour the solution has solidified. A rubber elastic tube is obtained which may be cut open to yield a corresponding foil.

*Example 4*

A polyester from phthalic acid and ethyleneglycol having an hydroxyl number of 39.2 and an acid number of 4.4 is reacted with hexamethylenediisocyanate in such an amount that each hydroxyl or carboxyl group corresponds to two isocyanate groups. The reaction product is mixed with two per cent of its weight of methyl pyrrolidine as a catalyst and dissolved in benzene. According to the method described in Example 3 foils result, which resemble in character soft polyvinylacetate products and which are suitable as safety glass interlayers. This combination is remarkable for the retarding influence of phthalic acid which makes it possible to obtain completely bubble free products.

*Example 5*

A polyesterisocyanate prepared from succinic acid and diglycol with an hydroxyl number of 35.8 and an acid number of 1.7 is mixed with two per cent of its weight of hexahydrodimethylaniline. The mixture is kept in a water-tight vessel. It may be employed as an adhesive for elastic medical bandages instead of the often undesirably stiff bandages from plaster of Paris.

*Example 6*

An adipic acid diglycolpolyester with the hydroxyl number of 36.0 and the acid number of 3.5 is reacted with 1.4-cyclohexanediisocyanate after dehydration in vacuo of 15 mm. Hg at 100° C. in such an amount that each hydroxyl or carboxyl group corresponds to two isocyanate groups. The mass is mixed with one per cent of its weight of hexahydrodimethylaniline and diluted with dried benzene to yield a 75 per cent solution. The solution can be stored indefinitely if water is completely excluded. Fabrics are coated on one side or both sides with the solution. After storing for an hour at room temperature, the humidity of the air being admitted, the coating solution has solidified to yield a rubber-elastic layer and the fabric has become water tight.

In a similar manner fabrics may be doubled. Products of this kind are particularly suitable as automobile covers.

*Example 7*

100 parts by weight of a polyesterisocyanate with 1.0 per cent NCO-groups, prepared from diethyleneglycol, adipic acid and hexamethylene-diisocyanate, are mixed with two parts of its weight of hexahydrodimethylaniline and then with ten parts of its weight of mechanical wood pulp. The components are well mixed and then cast into the desired mold. An elastic cellular material is formed with an enlargement of the volume within 15–20 minutes.

This process may advantageously be employed for imbedding an amputated limb in a quiver. For this purpose a quiver provided to receive the amputation stump is filled with the mass described above. The patient is caused to press his stump into the mass and keep this position for 20 minutes. During this period solidification of the mass has occurred and a true negative of the stump has been formed.

In the claims following hereafter the term "aliphatic isocyanates" includes all isocyanates in which the isocyanate groups are attached to a saturated aliphatic radical, i. e. it includes also cycloaliphatic isocyanates like diisocyanato-cyclohexane.

I claim:

1. A process as claimed in claim 11, wherein the tertiary amine is hexahydrodimethylaniline.

2. A process as claimed in claim 11, wherein the tertiary amine is methyl-pyrrolidine.

3. A process as claimed in claim 11, wherein the tertiary amine is dimethyl-piperazine.

4. A process as claimed in claim 11, wherein the tertiary amine is trimethylamine.

5. A process as claimed in claim 11, wherein the tertiary amine is perhydroethylcarbazol.

6. A composition as claimed in claim 12, wherein the tertiary amine is hexahydrodimethylaniline.

7. A composition as claimed in claim 12, wherein the tertiary amine is methyl-pyrrolidine.

8. A composition as claimed in claim 12, wherein the tertiary amine is dimethyl-piperazine.

9. A composition as claimed in claim 12, wherein the tertiary amine is trimethylamine.

10. A composition as claimed in claim 12, wherein the tertiary amine is perhydroethylcarbazol.

11. A process for the production of adhesive compositions which comprises mixing an anhydrous, substantially linear diisocyanate modified polyester produced by the reaction of an aliphatic diisocyanate with a polycarboxylic acid polyester, said reaction product containing as sole reactive groups isocyanate groups linked to aliphatic carbon atoms, with a catalytic amount of a tertiary amine free of reactive hydrogen and storing the product under anhydrous conditions.

12. A stable, anhydrous adhesive composition comprising substantially linear diisocyanate modified polyester produced by the reaction of an aliphatic diisocyanate with a polycarboxylic acid polyester, said reaction product containing as sole reactive groups isocyanate groups linked to aliphatic carbon atoms, and a catalytic amount of a tertiary amine free of reactive hydrogen, said composition being capable of solidifying upon admission thereto of water.

ERWIN WINDEMUTH.

References Cited in the file of this patent

UNITED STATES PATENTS

| Number | Name | Date |
|---|---|---|
| 2,424,885 | Buist et al. | July 29, 1947 |

OTHER REFERENCES

De Bell et al., German Plastics Practice, Murray Printing Co., Cambridge, Massachusetts (1946), pages 301, 312, 313, 316, 472 and 473.